United States Patent [19]
Kurtz et al.

[11] Patent Number: 5,473,944
[45] Date of Patent: Dec. 12, 1995

[54] SEAM PRESSURE SENSOR EMPLOYING DIELECTICALLY ISOLATED RESONANT BEAMS AND RELATED METHOD OF MANUFACTURE

[75] Inventors: Anthony D. Kurtz, Teaneck; Alexander A. Ned, Bloomingdale, both of N.J.

[73] Assignee: Kulite Semi Conductor Products, Inc., Leonia, N.J.

[21] Appl. No.: 292,406

[22] Filed: Aug. 18, 1994

[51] Int. Cl.$^6$ .............................. G01L 9/00; G01L 13/00
[52] U.S. Cl. ................................ 73/704; 73/702
[58] Field of Search ................ 73/702, 704, 708, 73/720, 726

[56] References Cited

U.S. PATENT DOCUMENTS

| | | | |
|---|---|---|---|
| 4,730,496 | 3/1988 | Knecht et al. | 73/718 X |
| 4,813,271 | 3/1989 | Greenwood | 73/702 |
| 5,003,825 | 4/1991 | Lew | 73/704 |
| 5,060,526 | 10/1991 | Barth et al. | 73/702 X |
| 5,142,912 | 9/1992 | Frische | 73/702 |
| 5,165,289 | 11/1992 | Tilmans | 73/702 X |
| 5,286,671 | 2/1994 | Kurtz et al. | 437/64 |

*Primary Examiner*—Richard Chilcot
*Assistant Examiner*—Joseph L. Felber
*Attorney, Agent, or Firm*—Arthur L. Plevy

[57] ABSTRACT

A pressure transducer comprising at least one diaphragm formed in a wafer of semiconducting material, the at least one diaphragm being spaced from a first surface of the wafer, a first layer of semiconducting material disposed over the at least one diaphragm, the first layer forming at least one resonating beam over the at least one diaphragm, and a plurality of resistor elements formed from a third layer of semiconducting material disposed over the at least one resonating beam, and isolation means for dielectrically isolating the at least one resonating beam from the at least one diaphragm.

9 Claims, 5 Drawing Sheets

SEAM PRESSURE SENSOR EMPLOYING DIELECTICALLY ISOLATED RESONANT BEAMS AND RELATED METHOD OF MANUFACTURE

FIELD OF THE INVENTION

This invention relates generally to resonant beam pressure transducers and more particularly, to such transducers having a pair of resonating beams at least one of which is dielectrically isolated from its associated pressure diaphragm and capable of reacting independently to an applied pressure.

BACKGROUND OF THE INVENTION

A great variety of transducers exist in the prior art which are used to measure force and pressure in different environments. Many of these sensors use piezoresistive, piezoelectric, and capacitive methods for measuring force and pressure. All the above transducers produce relatively low level analogue signals wherein both the zero pressure reading and the scale factor can vary as a function of temperature to one degree or another. Moreover, to get a digital signal from such a device requires a conversion of the analogue signal to a varying frequency. The consequences of the above are less precise force or pressure transducers.

On the other hand, transducers which rely on vibrating structures for the measurement of physical properties such as pressure and force have a number of advantages over the aforesaid conventional analogue transducer constructions. Although the prior art is replete with a myriad of vibrating structure transducers, all operate on the same basic principle; exciting a structure to its resonant frequency by external electrical means and applying a pressure or force to change the resonant frequency. The resulting change of the resonant frequency is proportional to the applied external stress and hence, is a measure of force or pressure. Moreover since the output is a change in frequency, digital data is obtained directly.

Older devices such as vibrating-cylinder pressure transducers manufactured by Hamilton-Standard and others, utilize the magneto-strictive effect to cause mechanical movement in the sensor, and the movement of the cylinder is detected by magnetic resonances.

There is also a wide body of prior art concerning resonant diaphragm pressure transducers using either metal or silicon diaphragms. In these devices, a diaphragm is excited into resonance and the change of resonant frequency with applied stress to the diaphragm is measured.

More recently, silicon resonant beam transducers have been disclosed. In this class of devices, a beam is mechanically coupled to a diaphragm in such a way that application of pressure to the diaphragm will induce a change in the state of stress of the beam causing its resonant frequency to vary in accordance with the applied pressure. The beam can be excited into mechanical vibration by applying an electrostatic force between the beam and the underlying diaphragm. The deflection of the beam is detected by means of piezoresistive sensors on one end of the beam. Such a resonant beam transducer and its method of fabrication were described in an article by Kurt Peterson et al. entitled, "Resonant Beam Pressure Sensor Fabricated with Silicon Fusion Bonding," published by the IEEE in 1991.

The present invention takes cognizance of the prior art but offers many fundamental improvements. All previous resonating transducer structures made use of a single resonating member whose resonant frequency was changed by the applied mechanical input. While this approach yields advantages over an analogue approach, it does not yield the optimum characteristics. However, in the present invention, two resonating members are utilized each of which may be affected by an externally applied stress to a different extent. For instance, one resonator may be totally unaffected by applied pressure while the other resonator's natural frequency will depend on the applied pressure. If now the two resonant frequencies are inputed into suitable electronics the difference or beat frequency between the two resonators may be obtained.

In this way since each beam's resonant frequency will change slightly with respect to temperature, this difference, however, will cancel out. Moreover, by measuring the beat or difference frequency, a greater inherent accuracy will result. If for instance, one can resolve the frequency to one part in $10^5$ and each natural frequency is of order 100 kHz and the difference is 10 kHz, an accuracy enhancement of a factor of 10 will result.

In addition, as will be shown in the following detailed description of the invention, the new improved method of fabrication utilizing diffusion-aided fusion bonding as described in U.S. Pat. No. 5,286,671 entitled FUSION BODING TECHNIQUE FOR USE IN FABRICATING SEMICONDUCTOR DEVICES issued to Kurtz et al. on Feb. 15, 1994 and assigned to Kulite Semiconductor Products, Inc., the assignee herein, which application is expressly incorporated herein by reference in its entirety, will enable the device to be operated at significantly higher temperatures than any other prior art silicon resonating structure. In the prior art, the piezoresistive sensors which act to measure the frequency response of the beams, have been made using p-n junction isolation techniques, whether the piezoresistive sensors were diffused or ion-implanted. In the present invention, making use of the methods taught in U.S. Pat. No. 5,286,671, the sensor network can be dielectrically isolated from the resonant beam. This not only makes for a cheaper, smaller structure but insures that the device can be used at temperature far in excess of the silicon p-n junction breakdown. The same is also true with respect to the voltage used to provide the electrostatic force between the beam and the diaphragm since, the beam can be dielectrically isolated from the diaphragm.

Many other unanticipated advantages arise from the proposed structure. For instance, if it is desired to measure an absolute pressure, i.e., that above vacuum, it is sufficient to insure that the back sides of each resonating beam structure is exposed to vacuum and only one of the resonating beams is connecting to a complaint diaphragm. In this way the application of an absolute pressure to the front side of the structure will only result in the change of frequency of the stress coupled beam. Thus, the difference frequency will be a direct measure of absolute pressure.

In a similar manner, if one wants to measure differential or gage pressure, one needs only to make both diaphragms compliant and expose one diaphragm to atmospheric pressure and the other to the gage pressure to be measured. The difference in resonant frequency between the two diaphragms pressure, coupled beams will give a response proportional to the gage or differential pressure.

SUMMARY OF THE INVENTION

A pressure transducer comprising two diaphragms formed in a wafer of semiconducting material, the diaphragms being spaced from a first surface of the wafer, a first layer of semiconducting material disposed over the two diaphragms, the first layer forming two resonating beams, one over each of the diaphragms, and a plurality of resistor elements formed from a third layer of semiconducting material disposed over each of the beams, and isolation means for dielectrically isolating the resistor elements from the respective beams and dielectrically isolating the beams from their respective diaphragms.

Also included in the present invention is a method for fabricating a resonating beam transducer comprising the steps of etching at least one cavity into a first surface of a first wafer of semiconducting material, depositing a first layer of dielectric material onto the first surface of the first wafer, forming a first degenerately doped layer of semiconducting material of the first conductivity on a surface of a second wafer of semiconducting material having a second conductivity opposite to the first conductivity, bonding the first and second wafers together so that the layer of semiconducting material is positioned directly over the at least one cavity, etching all but the degenerate layer away using a conductivity selective etch to form a resonating beam, forming a plurality of dielectrically isolated resistor elements on the resonating beam, and selectively etching a second surface opposite to said first surface of the first wafer to provide at least one diaphragm underlying the resonating beam.

BRIEF DESCRIPTION OF THE DRAWINGS

FIGS. 9–13A are cross-sectional views depicting the various steps employed in making the resistor elements from a third wafer of semiconducting material;

DETAILED DESCRIPTION OF THE INVENTION

The present invention relates to an improved beam pressure transducer employing a pair of resonating beams which are constructed such that they are dielectrically isolated from their respective pressure diaphragms. Additionally, the respective sensor networks are also dielectrically isolated from their respective beams. Also according to the present invention is a method for fabricating the above-described beam pressure transducer.

Each of the beams is constructed to have the same unstrained resident frequency, which under the application of pressure, can be made to change differently thus, enabling a frequency difference to be obtained.

For example, in one embodiment of the present invention, one such beam can have its diaphragm exposed to an applied pressure while the other beam's diaphragm can be exposed to an ambient pressure. Since the back of each beam can be referenced to a vacuum, each beam will react only to an absolute pressure. Thus, by obtaining the difference of the two beam frequencies, the gage pressure may be measured without exposing the beam structure to contamination, or to atmospheric pressure. Operation of the beam in vacuum will ensure a minimal mechanical loss and thereby provide a high Q for the structure.

In another embodiment of the present invention, the transducer is constructed so that one of the two beams will be stressed with the application of pressure while the other beam is not. In this way, the difference between the frequencies of the two beams will be a measure of the absolute pressure.

Thus, it should become apparent to one of ordinary skill in the art that the present invention offers many advantages over the prior art. The foremost one of these advantages is the use of two resonating beams which reduces and substantially eliminates all of the thermal effects between the two beams since each beam changes in the same way as a function of temperature. Moreover, the use of two beams in the differential condition enables the measurement of gage pressure by subtracting the resonant frequency of the applied gage pressure beam from that of the ambient pressure beam.

An additional benefit comes from the specific method of manufacture i.e. the use of dielectrically isolated diffusion enhanced fusion bonding, which yields a device which can operate at significantly higher temperatures than prior art devices.

Furthermore, an unforeseen advantage of the present method of manufacture is in the fabrication of the resonant beams which ensures better geometric control of the resonant beams. In typical prior art beam devices as earlier described, the beam thickness is determined by lapping and etch back techniques. Such techniques are necessitated because the construction of these devices require that the sensor network be implanted inside of the resonating beam. The consequences of such a construction is that the beam must be of a relatively high resistivity so that ion implantation can result in the formation of p-n junction sensor networks. In the present invention, however, the beam can be degenerate p-type silicon since the sensor network will be fusion bonded and thus, dielectrically isolated from the beam. As a result, the beam thickness is, and can be determined, by the diffusion depth of the p-type layer into the second wafer using conductivity selective etches. For degenerate p-type layers the depth of the layers can be controlled to a very small fraction of the diffusion depth. Thus, the resulting free beam thickness can be controlled to a very small fraction of a micron. Since the beam thickness is the smallest dimension of those dimensions that determine the beam resonance, the ability to control that dimension will inevitably lead to a diminimus variation in beam resonant frequency.

Figure 1:
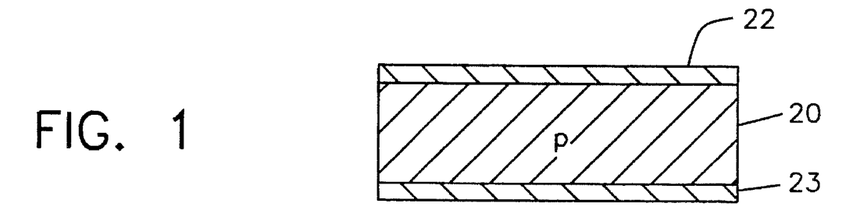
FIGS. 1–5 are cross-sectional views depicting the various steps employed in making the dielectric isolating layer and depression structures on a wafer of semiconducting material.

Referring now to FIG. 1, there is shown a first wafer 20 which can be fabricated from N or $P^+$-type semiconducting material such as silicon. In a preferred embodiment of the invention which will now be described, first wafer 20 is fabricated from $p^+$-type silicon having a thickness between approximately 3 and 10 mils. An oxide layer designated by numeral 22 is then grown over wafer 20 using any well known oxidation technique such as a wet or dry oxidation performed at an elevated temperature. In any event, passivating oxide layers 22 and 23 of preferably silicon dioxide are formed across the each surface of wafer 20. It should be noted that a silicon nitride layer may be used in place of the oxide layer.

Figure 2:
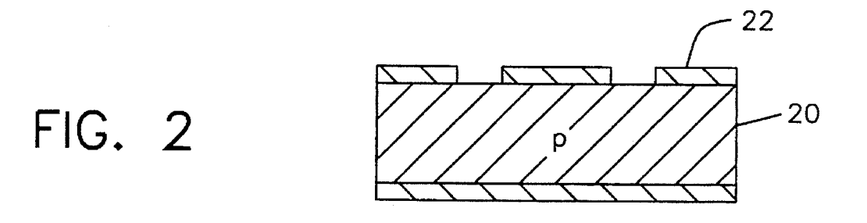
Figure 3:
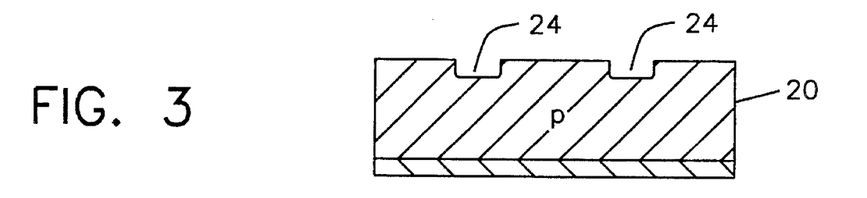
Figure 4:
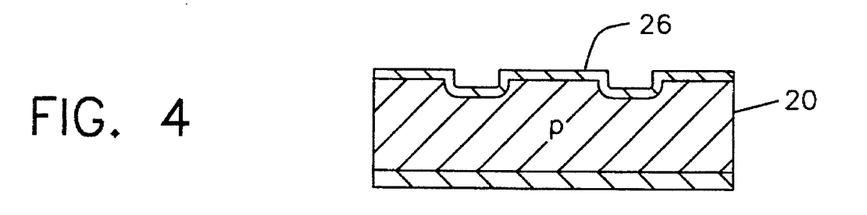
Figure 5:
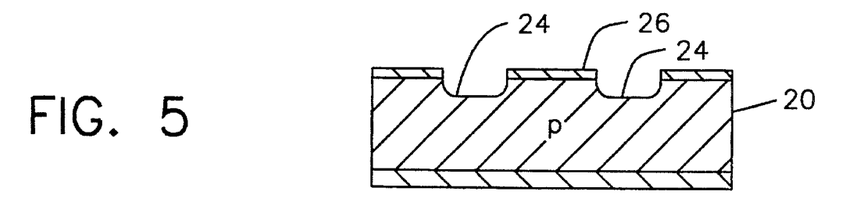

The oxide layer 22 is then patterned to form an etching mask as shown in FIG. 2. In FIG. 3, wafer 20 is shown after the silicon was etched and after the oxide layer 22 has been removed by etching. As can be seen, a series of shallow depressions 24 are formed in wafer 20 after these etching steps. The depth of each depression is on the order of a few microns. Wafer 20 is then re-oxidized to form another oxide layer 26 as show in FIG. 4. Finally, oxide layer 26 is selectively removed from the bottom of each depression 24 by etching, which results in the wafer structure shown in FIG. 5.

Figure 6:
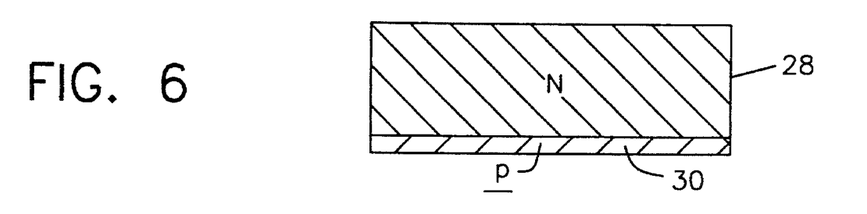
FIGS. 6–9 are cross-sectional views depicting the various steps employed in making the resonant beam structures from a second wafer of semiconducting material.

Referring now to FIG. 6, a second wafer 28 of n-type silicon semiconducting material is selected and is diffused to form a p$^+$-type layer 30 having a thickness on the order of several microns. Preferably, the thickness of the diffused layer is approximately between 1 and 10 microns. At this stage of fabrication, the p$^+$-type layer can be patterned to form the resonating beam structure, or patterning can be delayed until after the first and second wafers are bonded together as will be described in more detail below.

Figure 7:
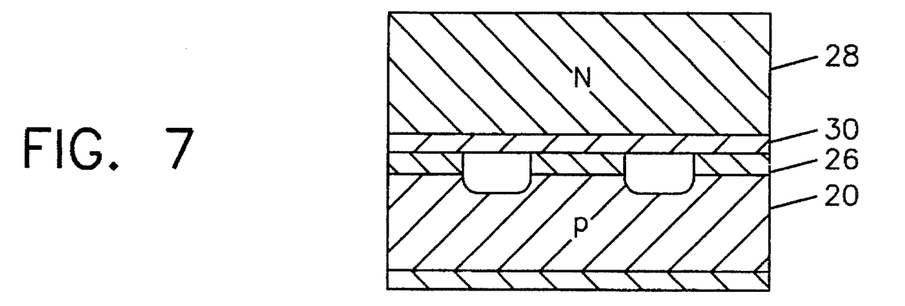

Regardless of whether the p$^+$-type layer 30 is patterned, the second wafer 28 is then bonded to the first wafer 20 using any suitable bonding technique as shown in FIG. 7. It is preferred, however, that diffusion enhanced fusion bonding be employed. This method of bonding is fully described in previously mentioned U.S. Pat. No. 5,286,671.

Figure 8:
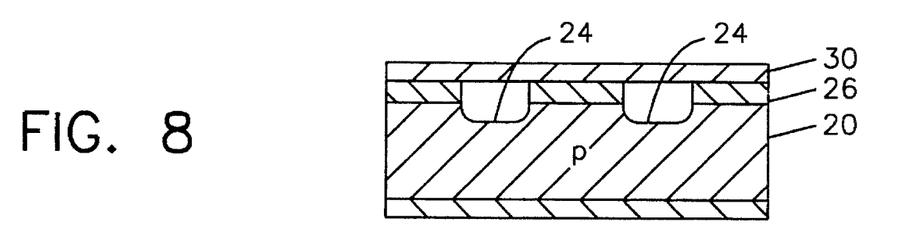
Figure 9:
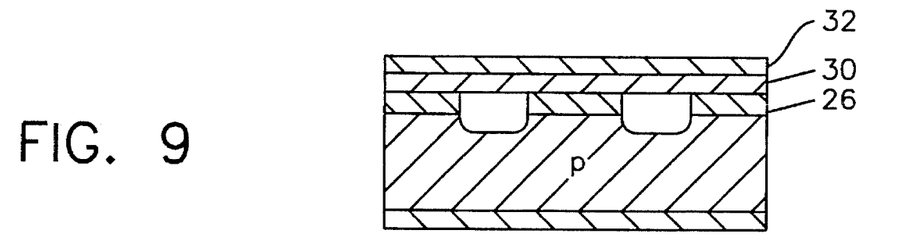

After bonding only the n-type material of the second wafer 28 is exposed. This material is subsequently etched away using any well known conductivity selective etching technique. After etching, as shown in FIG. 8, only the p$^+$-type layer 30 remains over wafer 20, covering the small depressions 24 therein. The oxide layer 26 acts to dielectrically isolate the p$^+$-type layer 30 from the first wafer 20. A second oxide layer 32 is then grown on the exposed side of p-type layer 30 using the aforementioned techniques as shown in FIG. 9.

Figure 10:
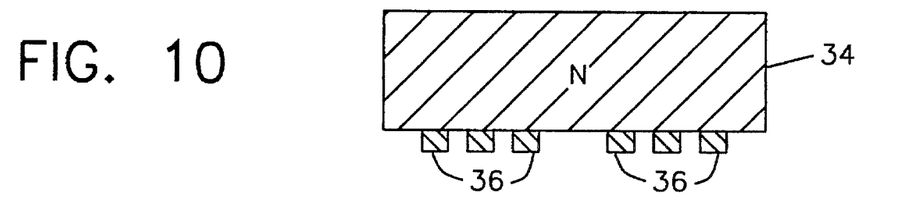

Referring now to FIG. 10, a third wafer 34 of n-type semiconducting material such as silicon, or the like, is selected and resistor elements are formed using the methods described in U.S. Pat. No. 5,286,671. For instance, this can be accomplished by diffusing a p$^+$-type layer in one side of the wafer 34. Grids are then defined on the diffused layer, and the grids are then etched down to the n-type material of the wafer 34. The remaining p$^+$-type segments form the resistor elements 36 as shown in FIG. 10. Note also that other methods of forming the resistor elements are described in U.S. Pat. No. 5,286,671.

Figure 11:
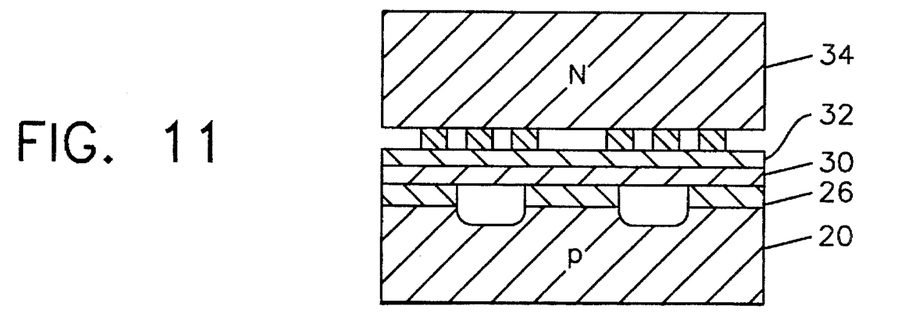
Figure 12:
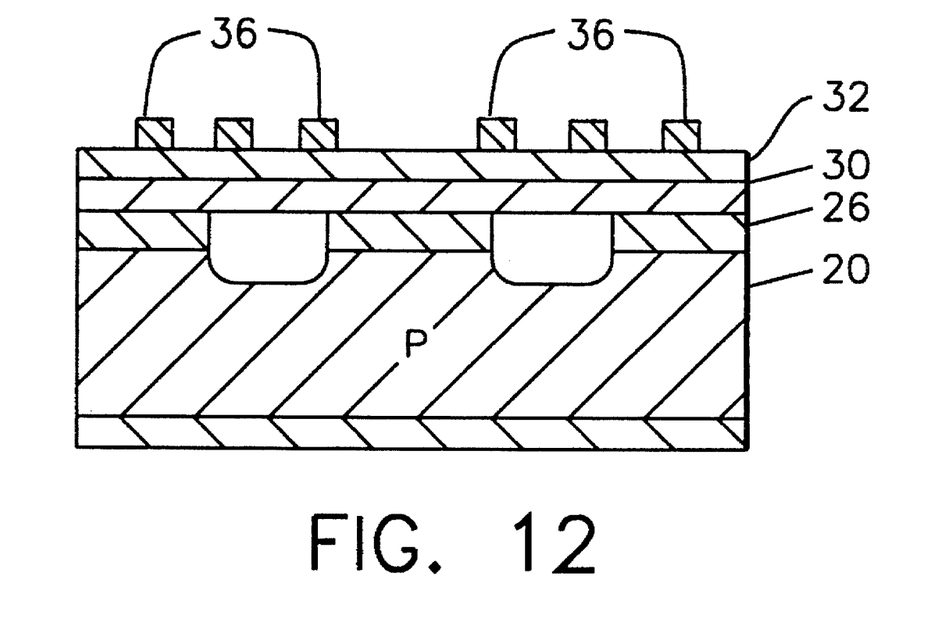

The third wafer 34 is then bonded to the oxide layer 32 as taught in U.S. Pat. No. 5,286,671. The resulting structure at this stage is shown in FIG. 11. As can be seen in FIG. 11, only the n-type material of the third wafer is exposed after bonding. This portion of wafer 34 is subsequently removed by using a conductivity selective etching technique which results in the structure shown in FIG. 12. As can be seen, a resistor network made up of resistor elements 36 is formed at one end of what will be each resonant beam.

Figure 13A:
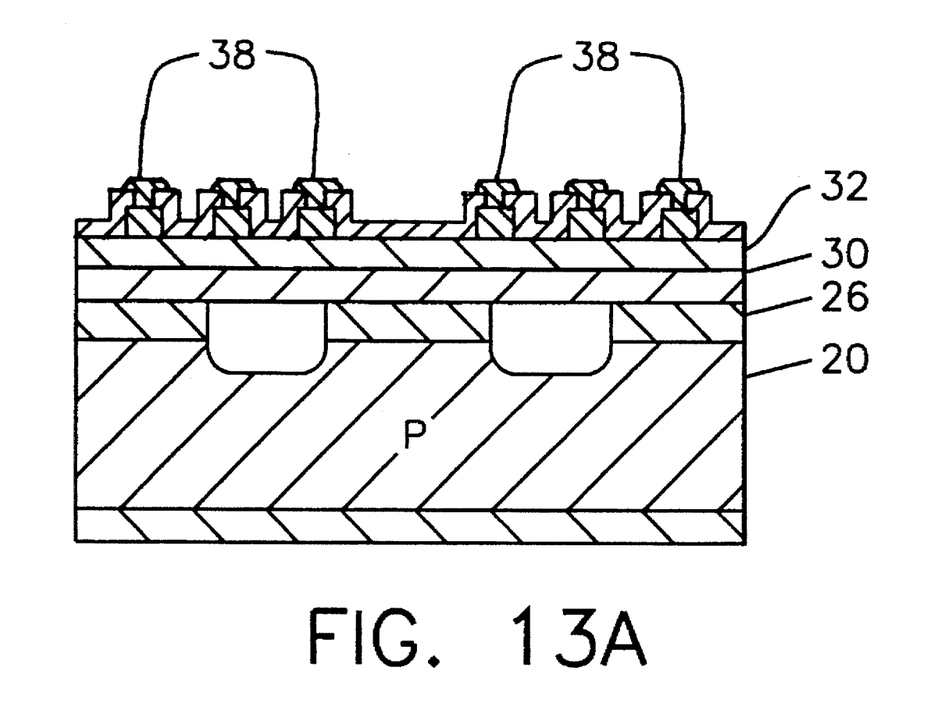
Figure 13B:
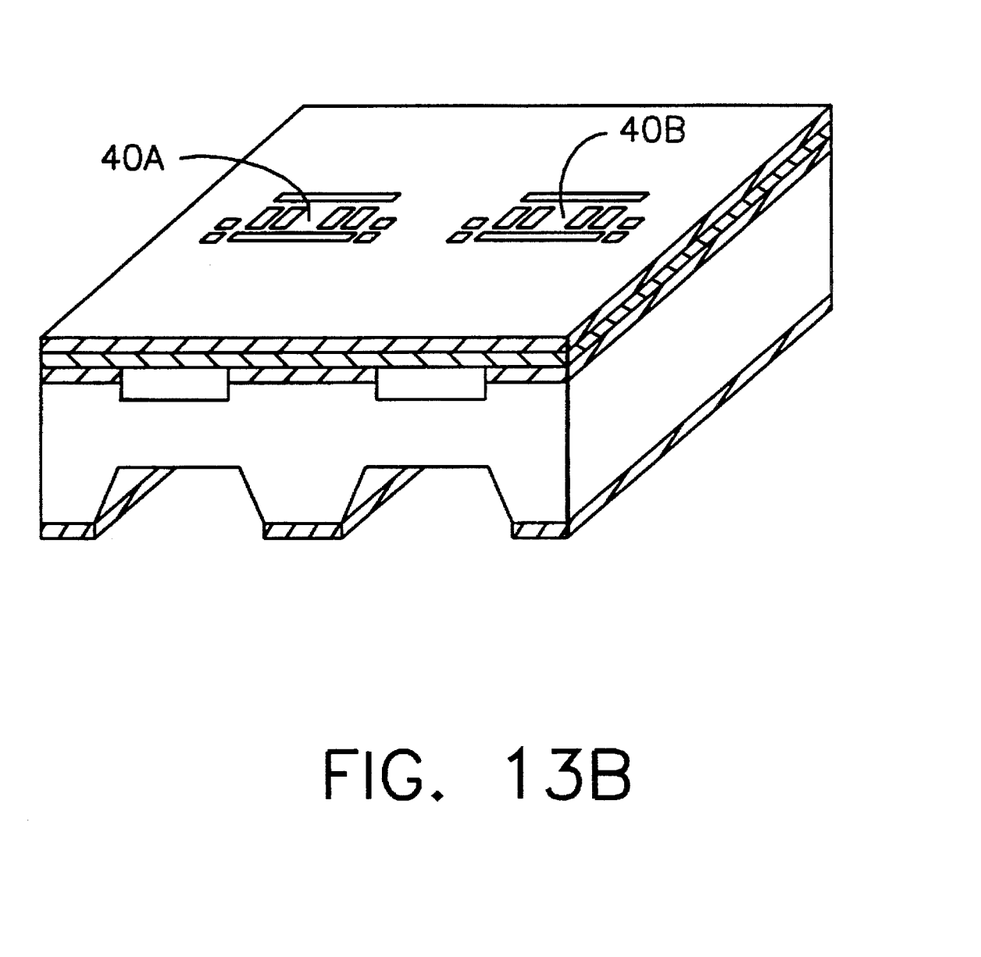
FIG. 13B is a perspective view of the present invention.

Referring now to FIGS. 13A and 13B, if at this stage of fabrication, the resonant beams have not yet been defined, then the resistor network is masked and the resonant beams 40A and 40B are formed by defining two parallel slots in oxide layer 32 and p$^+$-type layer 30 just above each shallow depression 24 using conventional etching techniques as shown in FIG. 13B. Also during this etching step, a contact window is defined in the mask layer over each resistor element. The contact windows are then filled by depositing a metal layer over the oxide layer using well known evaporation or sputtering techniques. The contacts 38 are finalized by patterning the metal layer using conventional photolithographic techniques as shown in FIG. 13A. A one contact metal system is preferred for making high temperature contacts to the resistor elements formed from p$^+$-type semiconductor material and a PT silicide/Ti/PT system, although many others metallurgical systems may be employed.

Figure 14:
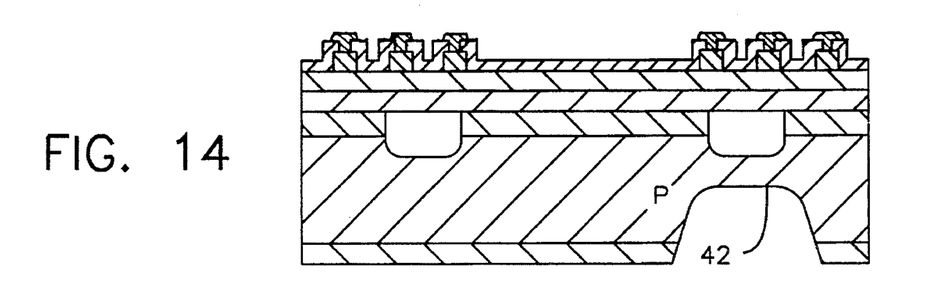
FIG. 14 is a cross-sectional view of an embodiment of the present invention which employs a single diaphragm structure.
Figure 15:
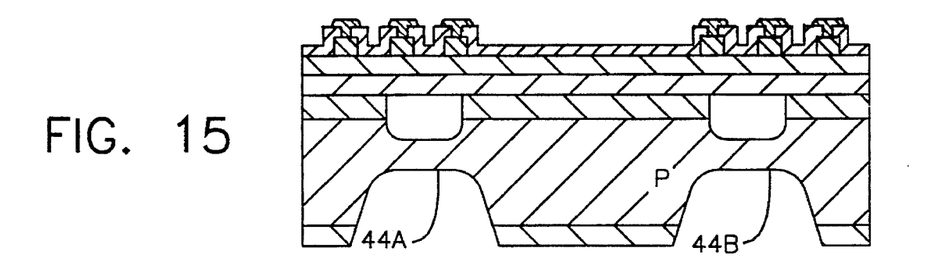
FIG. 15 is a cross-sectional view of an alternative embodiment of the present invention which employs a dual diaphragm structure.

The final step in the process involves forming the diaphragms of the device as shown in the embodiment of FIG. 14 or the embodiment of FIG. 15. In both embodiments, a mask layer is deposited on the back side of the wafer 20. The masking material can be platinum, silicon dioxide or silicon nitride, all of which can be deposited by chemical vapor deposition or sputtering. The mask layer is patterned photolithographically and etched to form one aperture 42 as shown in the embodiment of FIG. 14 or patterned and etched to form two apertures 44A and 44B as shown in the embodiment of FIG. 15.

Figure 16:
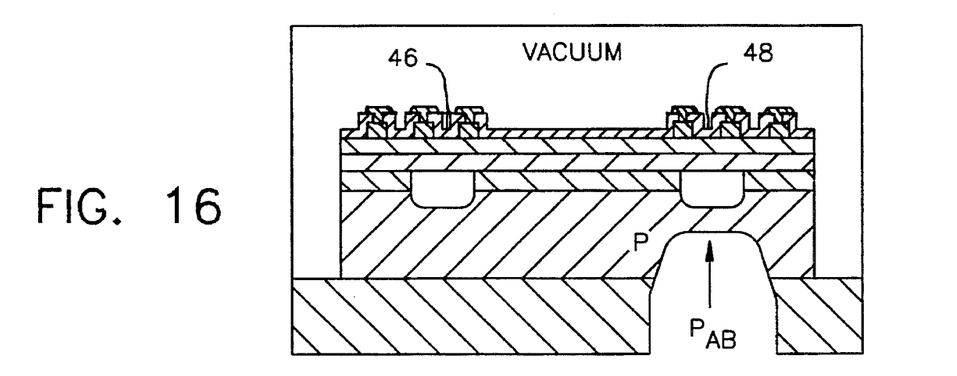
FIG. 16 depicts an exemplary application of the transducer of FIG. 14.

The operation of the device will now be described with reference to FIGS. 16 and 17. In FIG. 16, the pressure transducer shown in FIG. 14, is situated such that the back of the beams 46 and 48 are referenced to a vacuum while a voltage is applied between the beam and the diaphragm which causes each of the beams to vibrate at a resonant frequency indicative of no applied pressure. This is made possible by fabricating contacts between the beams and the diaphragm. The contacts can be made by depositing metalization between the beams and diaphragm. Any other type of contact may be employed, however, as such techniques are well known in the art. When a pressure $P_{ab}$ is applied to the diaphragm, the resonant frequency of beam 48 changes to a resonant frequency which is indicative of the pressure being applied to the diaphragm. The difference between the changed resonant frequency of beam 48 and the unchanged resonant frequency of beam 46 is indicative of the absolute pressure $P_{ab}$ applied to the diaphragm. This measurement of force is unaffected by changes in the operational temperature of the transducer since both beams are affected equally by the changes in the operational temperature.

Figure 17:
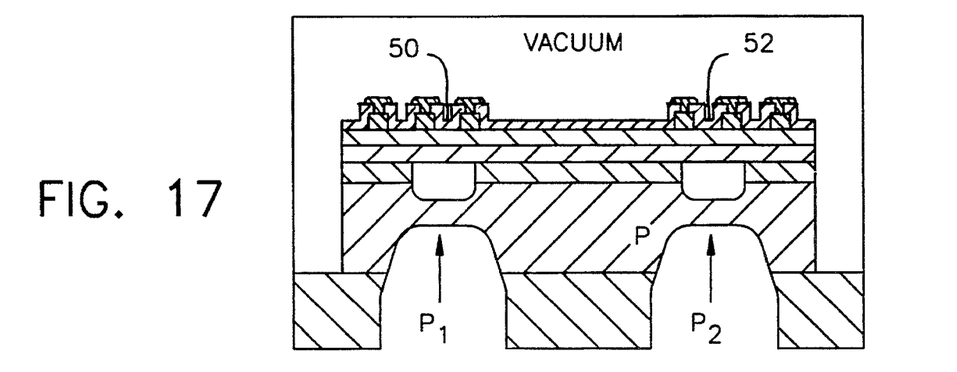
FIG. 17 depicts an exemplary application of the transducer of FIG. 15.

In FIG. 17, the pressure transducer shown in FIG. 15, is situated in the same fashion as described above such that the back of the resonant beams 50 and 52 are referenced to a vacuum while a voltage is applied between the beam and the diaphragm which causes each of the beams to vibrate at a resonant frequency indicative of no applied pressure. This is made possible by fabricating contacts between the beams as the diaphragm. The contacts can be made as described above by depositing metalization between the beams and diaphragm. In any event, when pressure is applied to the diaphragm associated with beam 50, the resonant frequency of beam 50 changes to a resonant frequency which is indicative of the force being applied to its associated diaphragm. At the same time an ambient force $P_2$ is applied to the diaphragm associated with beam 52 which cause the resonant frequency of beam 52 to change to a resonant frequency indicative of the ambient force. The difference between the resulting changed resonance frequencies of both beams 50 and 52 is a measure of gage pressure. Further, like in the example above, this measurement of gage pressure is unaffected by changes in the operational temperature of the transducer since both beams are affected equally by the changes in the operational temperature of the transducer.

It should be understood that the embodiments described herein are merely exemplary and that many alternate embodiments and additional embodiments will become apparent to those skilled in the art. Accordingly such alternative embodiments and additional embodiments are to be construed as being within the spirit of the present invention even though not explicitly set forth herein, the present invention being limited only by the content and scope of the claims appended hereto.

We claim:

1. In a pressure transducer of the type comprising at least one diaphragm formed in a wafer of semiconducting material, said at least one diaphragm being spaced from a first surface of said wafer, a first layer of semiconducting material disposed over said at least one diaphragm, said first layer forming at least one resonating beam over said at least one diaphragm, and a plurality of resistor elements formed from a third layer of semiconducting material disposed over said at least one resonating beam, the improvement therewith, comprising:

isolation means for dielectrically isolating both said at least one diaphragm and said plurality of resistors from said at least one resonating beam.

2. The pressure transducer according to claim 1, wherein said isolation means comprises a first oxide layer of dielectric material disposed between said at least one resonating beam and said wafer and a second oxide layer of dielectric material disposed between said at least one resonating beam and said plurality of resistors.

3. The pressure transducer according to claim 1, wherein said semiconducting material is silicon.

4. The pressure transducer according to claim 1, wherein said at least one diaphragm comprises first and second diaphragms and said at least one resonating beam formed by said first layer comprises first and second resonating beams, said first beam being disposed over said first diaphragm and said second beam is disposed over said second diaphragm, wherein said plurality of resistor elements are disposed over each of said beams, and wherein said first beam and said second beam are dielectrically isolated from said first and second diaphragms and said plurality of resistors are dielectrically isolated from said first and second beams.

5. The pressure transducer according to claim 4, further comprising evacuation means for maintaining said first and second beams in a vacuum whereby a voltage applied to said beams causes each of said beams to vibrate at a resonant frequency indicative of no applied pressure, said resonant frequency of said first beam changing to a first strained resonant frequency indicative of a pressure applied to said first diaphragm and said resonant frequency of said second beam changing to a second strained resonant frequency indicative of an ambient pressure applied to said second diaphragm, the difference of said first and said second strained resonant frequencies being indicative of a gage pressure and unaffected by changes in the operational temperature of said transducer.

6. The pressure transducer according to claim 5, further comprising electrical contact means in said first layer of semiconducting material, said contact means being located in a region adjacent to each of said beams, said beams being excited into resonance by applying an AC voltage signal to said contact means.

7. The pressure transducer according to claim 4, further comprising evacuation means for maintaining said first and second beams in a vacuum whereby a voltage applied to said beams causes each of said beams to vibrate at a first resonant frequency indicative of no applied pressure, said resonant frequency of said first beam changing to a second resonant frequency indicative of a pressure applied to said first diaphragm, said second diaphragm being of a thickness which does not allow said second diaphragm to deflect thereby causing said second diaphragm to be unaffected by said pressure, the difference of said first resonant frequency and said second resonant frequency being indicative of an absolute pressure and unaffected by changes in the operational temperature of said transducer.

8. The pressure transducer according to claim 6, further comprising electrical contact means in said first layer of semiconducting material, said contact means being located in a region adjacent to each of said beams, said beams being excited into resonance by applying an AC voltage signal to said contact means.

9. The pressure transducer according to claim 1, wherein a contact is provided on each of said resistor elements.

* * * * *

UNITED STATES PATENT AND TRADEMARK OFFICE
CERTIFICATE OF CORRECTION

PATENT NO. : 5,473,944

DATED : December 12, 1995

INVENTOR(S) : Anthony D. Kurtz et al.

It is certified that error appears in the above-identified patent and that said Letters Patent is hereby corrected as shown below:

```
Cover page [54] Change"SEAM"to --BEAM--
Column 1,
        first word change"SEAM"to --BEAM--
```

Signed and Sealed this

Twenty-seventh Day of February, 1996

*Attest:*

BRUCE LEHMAN

*Attesting Officer*   *Commissioner of Patents and Trademarks*